United States Patent
Rasmussen et al.

(10) Patent No.: US 10,042,397 B2
(45) Date of Patent: Aug. 7, 2018

(54) ENERGETIC POTTING MATERIALS, ELECTRONIC DEVICES POTTED WITH THE ENERGETIC POTTING MATERIALS, AND RELATED METHODS

(71) Applicant: BATTELLE ENERGY ALLIANCE, LLC., Idaho Falls, ID (US)

(72) Inventors: Nikki Rasmussen, Rexburg, ID (US); Reston A Condit, Idaho Falls, ID (US)

(73) Assignee: BATTELLE ENERGY ALLIANCE, LLC., Idaho Falls, ID (US)

( * ) Notice: Subject to any disclaimer, the term of this patent is extended or adjusted under 35 U.S.C. 154(b) by 65 days.

(21) Appl. No.: 15/046,979

(22) Filed: Feb. 18, 2016

(65) Prior Publication Data

US 2017/0242459 A1    Aug. 24, 2017

(51) Int. Cl.
| | |
|---|---|
| C06B 45/10 | (2006.01) |
| G06F 1/18 | (2006.01) |
| C06B 45/18 | (2006.01) |
| C06B 43/00 | (2006.01) |
| H05K 1/11 | (2006.01) |
| C06B 27/00 | (2006.01) |
| G06F 21/86 | (2013.01) |
| H05K 5/02 | (2006.01) |
| D03D 23/00 | (2006.01) |

(52) U.S. Cl.
CPC ............. *G06F 1/182* (2013.01); *C06B 27/00* (2013.01); *C06B 43/00* (2013.01); *C06B 45/105* (2013.01); *C06B 45/18* (2013.01); *G06F 21/86* (2013.01); *H05K 1/111* (2013.01); *H05K 1/115* (2013.01); *H05K 5/0208* (2013.01); *G06F 2221/2143* (2013.01)

(58) Field of Classification Search
USPC .......................................................... 149/19.4
See application file for complete search history.

(56) References Cited

U.S. PATENT DOCUMENTS

| | | | | |
|---|---|---|---|---|
| 3,882,323 | A | * | 5/1975 | Smolker ................. F41H 13/00 |
| | | | | 102/202.5 |
| 4,101,352 | A | * | 7/1978 | Poulin ..................... C06B 33/06 |
| | | | | 149/113 |
| 5,200,125 | A | | 4/1993 | Osada |
| 5,665,653 | A | | 9/1997 | Bare et al. |
| 5,961,912 | A | | 10/1999 | Huang et al. |
| 6,029,343 | A | | 2/2000 | Wieloch |
| 6,810,815 | B2 | | 11/2004 | Mueller-Fiedler et al. |
| 7,268,303 | B2 | | 9/2007 | Ashida |

(Continued)

OTHER PUBLICATIONS

Honeychuck, et al. "Preparation and Characterization of Polyurethanes Based on a Series of Fluorinated Dials", Chem. Mater. 5, (1993) pp. 1299-1306.

(Continued)

*Primary Examiner* — James E McDonough
(74) *Attorney, Agent, or Firm* — TraskBritt

(57) ABSTRACT

A potted electronic device comprises an electronic device at least partially encapsulated by an energetic potting material. The energetic potting material comprises a halogenated urethane binder and a metal fuel dispersed within the halogenated urethane binder. Related energetic potting materials and methods of forming electronic devices at least partially encapsulated with the energetic potting materials are also disclosed.

25 Claims, 4 Drawing Sheets

(56) References Cited

U.S. PATENT DOCUMENTS

| | | | |
|---|---|---|---|
| 7,332,690 B2 | 2/2008 | Schmiedlin et al. | |
| 7,632,365 B1 * | 12/2009 | D'Arche | C06B 33/12 |
| | | | 149/37 |
| 7,785,135 B2 | 8/2010 | Wu | |
| 9,155,189 B1 | 10/2015 | Chen et al. | |
| 9,158,880 B2 | 10/2015 | Pan et al. | |
| 2006/0197635 A1 | 9/2006 | Christenson | |
| 2007/0056459 A1 | 3/2007 | Martinez-Tovar et al. | |
| 2009/0078345 A1 | 3/2009 | Kellett et al. | |
| 2009/0105738 A1 | 4/2009 | Apperson et al. | |
| 2009/0152873 A1 | 6/2009 | Gangopadhyay et al. | |
| 2013/0143330 A1 | 6/2013 | Apperson et al. | |
| 2013/0149460 A1 | 6/2013 | Becker et al. | |

OTHER PUBLICATIONS

Canak et al, "Synthesis of flourinated urethane acrylate based Uv-curable coating", Progress in Organic Coatings 76, (2013), pp. 388-399.

* cited by examiner

ENERGETIC POTTING MATERIALS, ELECTRONIC DEVICES POTTED WITH THE ENERGETIC POTTING MATERIALS, AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

CROSS-REFERENCE TO RELATED APPLICATION

The present application is related to co-pending U.S. patent application Ser. No. 15/046,970, filed on even date herewith and entitled ELECTRONIC CIRCUITS COMPRISING ENERGETIC SUBSTRATES AND RELATED METHODS, the disclosure of which is hereby incorporated herein it its entirety by this reference.

FIELD

Embodiments of the disclosure relate generally to energetic potting materials and electronic devices potted with the energetic potting materials. More particularly, embodiments of the disclosure relate to energetic potting materials configured and formulated to destroy electronic devices encapsulated by the energetic potting materials, to related encapsulated electronic devices, and to related methods of forming the energetic potting material and the potted electronic devices.

BACKGROUND

In an effort to protect electronic devices (e.g., printed circuit boards (PCBs), processors, logic circuits, volatile memory, non-volatile memory, etc.), from vibration, moisture, corrosion, or other potential damage attributable to the surrounding environment, usage conditions, or both, the electronic devices are often coated or encapsulated with a potting material. The potting material may at least substantially isolate the electronic device from one or more conditions or events that may damage the electronic device.

A user of an electronic device may store valuable information including, for example, confidential, private, or personal information in memory of the electronic device. After the electronic device has reached an end of its useful life, the user may desire to protect the information stored therein from being viewed or accessed by others. In addition to protecting the electronic device from potential damage, potting materials may also be used to increase a difficulty of accessing information stored within the electronic device, should some unauthorized person try to access it.

Conventional potting materials include a solid or a gelatinous compound, such as a silicone or an epoxy. The potting materials are chemically inert and unreactive with the electronic device encapsulated by the potting material. Although the potting material may prevent immediate access to information stored within the potted electronic device, a person of ordinary skill in the art may, at least in some instances, obtain at least some of the information (e.g., programs and data) stored within the electronic device by carefully removing the potting material from the electronic device. Thus, even though the electronic device is potted in a conventional potting material, information stored in potted electronic devices may still be obtained or accessed by others.

Military and national security applications for electronics may require enhanced security measures to protect software (i.e., firmware) used by, as well as information stored on, electronic devices. Should such devices be captured intact, even when conventionally potted, programs and information on the devices may be accessed without great difficulty by a skilled, determined adversary.

BRIEF SUMMARY

In accordance with one embodiment described herein, a potted electronic device comprises an electronic device at least partially encapsulated by an energetic potting material. The energetic potting material comprises a halogenated urethane binder and a metal fuel dispersed within the halogenated urethane binder.

In additional embodiments, an energetic potting material formulated and configured to provide environmental protection to an electronic device, the energetic potting material comprising a halogenated urethane binder, and at least one metal fuel selected from the group consisting of magnesium, titanium, tantalum, zirconium, hafnium, aluminum, nickel, cobalt, iron, zinc, molybdenum, oxides thereof, and hydrides thereof, dispersed within the halogenated urethane binder.

In further embodiments, a method of forming an at least partially encapsulated electronic device comprises mixing metal particles with at least one halogenated polyol to form a mixture of the metal particles dispersed within the at least one halogenated polyol, mixing the mixture with a diisocyanate to form a urethane blend comprising a reaction product of the halogenated polyol and the diisocyanate, the metal particles dispersed within the urethane blend, and contacting a substantial portion of an electronic device with the urethane blend.

DETAILED DESCRIPTION

Figure 1:
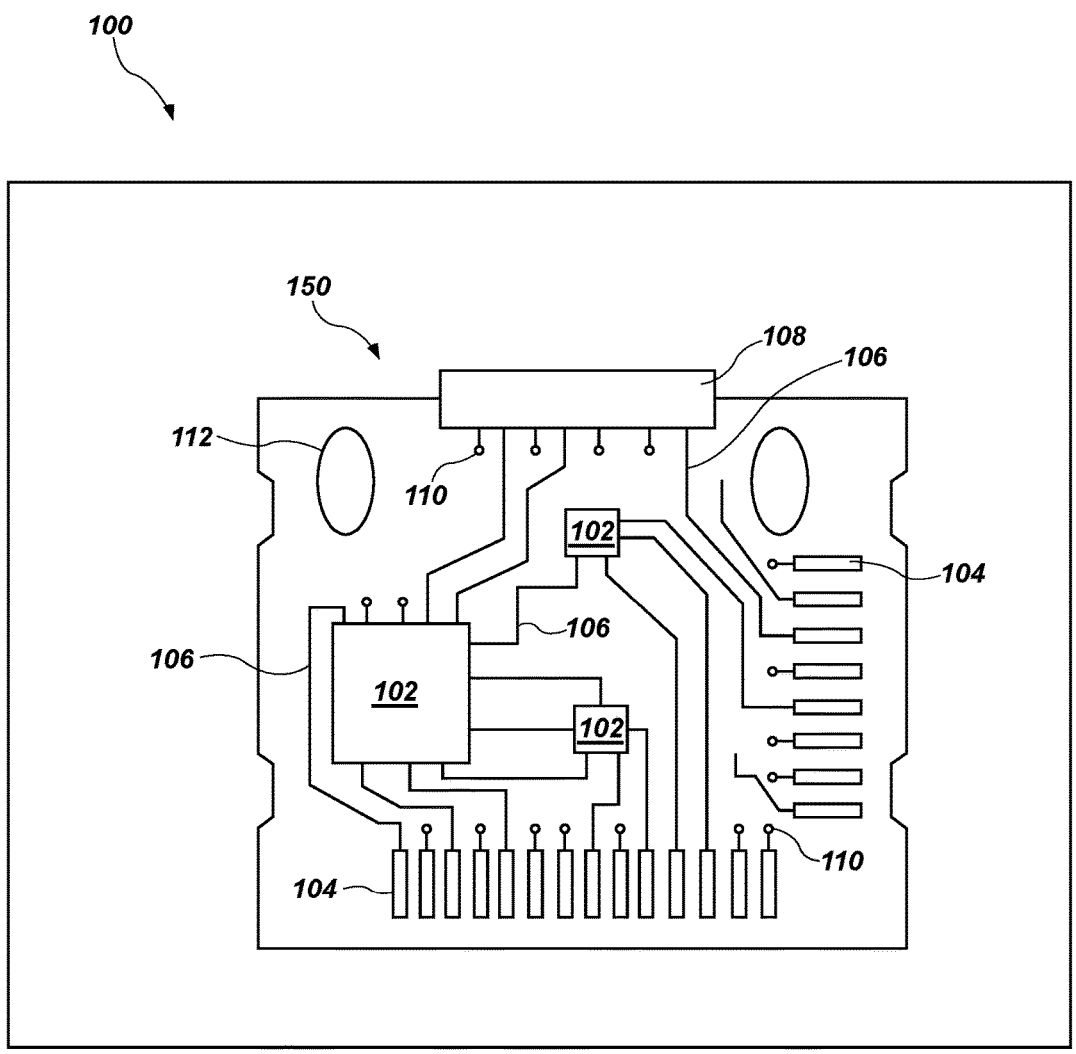
FIG. 1 is a schematic illustration of an electronic device including a circuit board.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or reaction system for forming energetic potting materials or electronic devices encapsulated with the energetic potting materials. The structures described below do not form a complete apparatus or a complete reaction system. Only those process acts and structures necessary to understand the embodiments of the disclosure are described in detail below. Additional acts to form an energetic potting material or an electronic device including the energetic potting material may be performed by conventional techniques. Also note, any drawings accompanying the present application are for illustrative purposes only, and are thus not drawn to scale. Additionally, elements common between figures may retain the same numerical designation.

A user of an electronic device including, for example, a printed circuit board (PCB), a processor, logic, volatile memory, non-volatile memory, etc., may store personal, commercially valuable, national security, or otherwise confidential information within the electronic device. In the event that the electronic device is lost or an unauthorized user attempts to access information stored within the electronic device, the user may desire to destroy the information stored therein. For example, the user may desire that the electronic device self-destruct if it is determined that an unauthorized user is attempting to obtain the information stored therein. In addition, after the electronic device has reached the end of its useful life, the user thereof may desire to remove (e.g., erase) the information stored therein. However, complete removal of the information stored within the electronic device or destruction of the device itself may be problematic using conventional techniques. In some instances, a user may be under the impression that information stored within the electronic device has been removed, even though valuable information remains stored within the electronic device and may be accessed. Thus, to prevent data stored in the electronic device from being retained and thus potentially recovered by unauthorized persons or organizations, a user may desire to destroy their old electronic devices.

According to embodiments described herein, an electronic device may be encapsulated (i.e., potted) in an energetic potting material or may include one or more components that are encapsulated by the energetic potting material. The energetic potting material may provide environmental protection for the encapsulated components and be substantially inert and unreactive with components of the electronic device until a sufficient activation energy is provided thereto to initiate reaction of the energetic potting material. Reaction of the energetic potting material may release sufficient heat to substantially completely destroy the electronic device potted by the energetic potting material. The energetic potting material may include an oxidizer, such as a halogenated urethane binder, and a metal fuel, such as one or more of magnesium, titanium, tantalum, zirconium, hafnium, aluminum, nickel, cobalt, iron, zinc, molybdenum, oxides thereof, hydrides thereof, or combinations thereof. The halogenated urethane binder may include a two-component urethane including, for example, a halogenated diol (e.g., a diol of a perfluoroalkoxy alkane) and an isocyanate (e.g., methyl diphenyl diisocyanate (MDI)). Upon ignition, halogens from the halogenated urethane binder may exothermically react with the metals in the energetic potting material to form halogenated metals. Heat released during formation of the halogenated metals may substantially completely destroy the encapsulated electronic device or critical components thereof.

FIG. 1 is a simplified cross-sectional view of an electronic device 100 including a circuit board 150. The circuit board 150 may comprise a printed circuit board (PCB), or other substrate bearing integrated circuits comprising a processor, logic, and memory such as, for example, dynamic random access memory (DRAM), static random access memory (SRAM), Flash memory, programmable read-only memory (PROM), or other types of memory suitable for storing information. The electronic device 100 may be incorporated in a desktop computer, a laptop computer, a cellular phone, a data storage device, or other electronic system configured for storing information, executing instructions, or both, as well as performing other functions.

The circuit board 150 may include conductive pads 104 on one side of the circuit board 150 connected to one or more conductive vias 110 extending through the circuit board 150. One or more connectors 108 may be configured to connect the circuit board 150 to one or more other components of the electronic device 100, such as to a logic die, another PCB (as in multi-layer PCBs), or higher level packaging, etc., as known in the art. Conductive traces 106 may interconnect circuitry of the circuit board 150, such as the integrated circuits 102 in the form of semiconductor dice, conductive pads 104, connectors 108, and other components of the circuit board 150. The circuit board 150 may further include capacitors 112, and other electrical components, such as, for example, one or more resistors.

Although FIG. 1 illustrates only one circuit board 150 comprising the electronic device 100, the electronic device 100 may include a plurality of circuit boards 150 and electrical components thereon, all of which may be potted by an energetic potting material, as described herein.

Figure 2A:
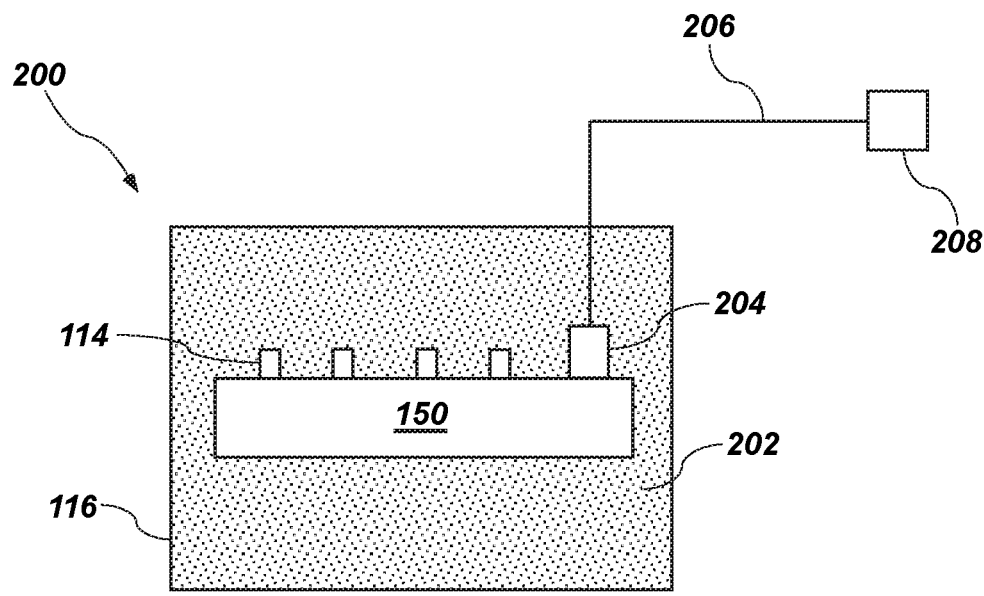
FIG. 2A is a simplified cross-sectional view of a circuit board of an electronic device encapsulated with an energetic potting material, in accordance with an embodiment of the disclosure.

Components of the electronic device 100 may contain information that is confidential and of some value for particular applications. FIG. 2A is a simplified cross-sectional view of a potted electronic device 200 including the circuit board 150 of FIG. 1 encapsulated with an energetic potting material 202. Electrical components 114 (e.g., integrated circuits 102, conductive pads 104, conductive traces 106, connectors 108, capacitors 112, etc., as described above with reference to FIG. 1) of the circuit board 150 may be substantially surrounded and encapsulated by the energetic potting material 202. The energetic potting material 202 may be disposed over surfaces of the circuit board 150. In some embodiments, substantially all surfaces of the circuit board 150 may be surrounded by the energetic potting material 202.

The circuit board 150 may be disposed within a housing 116 configured for holding the circuit board 150 and other components of the electronic device 100 (FIG. 1). By way of nonlimiting example, the housing 116 may be a mobile phone housing, a laptop housing, a desktop computer housing, or other container in which one or more electronic devices 100 or systems including one or more electronic devices 100 are disposed. Accordingly, in some instances, the energetic potting material 202 may be provided within inner portions of the housing 116 containing the electronic device 100. For example, electrical components of a desktop computer may be contained within a housing 116 configured for housing the electrical components. As an example, electrical components of a laptop computer encapsulated with an energetic potting material may be housed within at least one compartment of the laptop. A user may continue use of the laptop until a time when a reaction of the energetic potting material 202 is initiated. In some such embodiments, the energetic potting material 202 may destroy the electronic device 100 if or when an unauthorized user attempts to access information stored within the electronic device 100.

A mass of the energetic potting material 202 may be between about one time and about ten times a mass of the electronic device 100, such as between about one and about three, between about three and about five, or between about five and about ten times a mass of the electronic device 100. In some embodiments, the mass of the energetic potting material 202 may be at least about three times the mass of electronic device 100.

The energetic potting material 202 may be coupled to an ignition device 204 configured to provide a sufficient activation energy to initiate ignition of the energetic potting material 202. In some embodiments, the ignition device 204 includes an ignition wire 206 coupled to a power source 208 and configured to provide a voltage or current to activate the ignition device 204 proximate a surface of the energetic potting material 202. Ignition device 204 may comprise, for example, a hot bridge wire (HBW) initiator, a semiconductor bridge (SCB) initiator, an exploding foil initiator (EFI), and explosive bridge wire (EBW) initiator, a solid state electro-explosive device (EED), or other suitable initiator. The power source 208 may include a battery, a capacitor, conventional line power, transformer output, or another suitable power source. When the ignition device 204 is activated, the energetic potting material 202 proximate the ignition device 204 may be ignited to initiate a reaction of the urethane binder and the metal fuel. Although FIG. 2A illustrates the ignition device 204 directly on the circuit board 150, the ignition device 204 may be coupled to the energetic potting material 202 at other locations, such as proximate the housing 116.

Figure 2B:
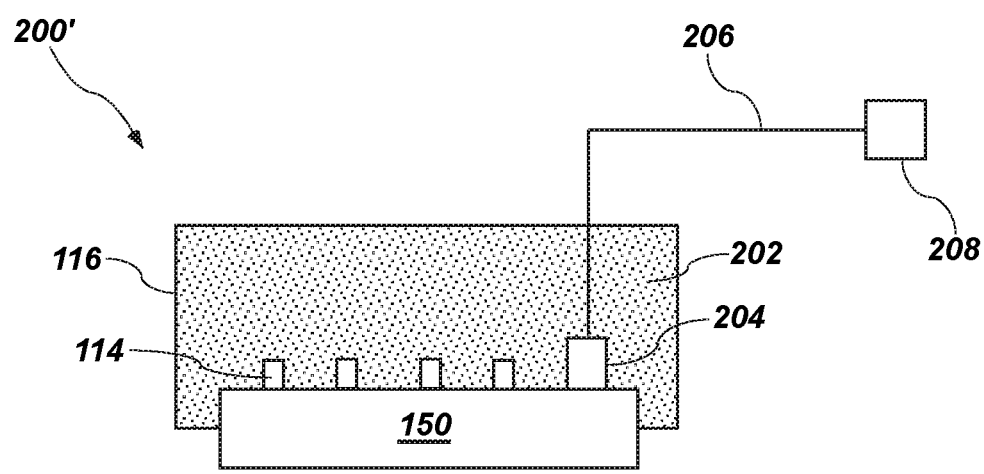
FIG. 2B is a simplified cross-sectional view of a circuit board of an electronic device including an energetic potting material over at least one surface thereof, in accordance with another embodiment of the disclosure.

FIG. 2B illustrates another potted electronic device 200' including the energetic potting material 202 over only some surfaces of the circuit board 150, such as surfaces including the electrical components 114. Although the energetic potting material 202 is illustrated as being blanket deposited over the circuit board 150, in some embodiments, the energetic potting material 202 may conformally overlie surfaces (e.g., the electrical components 114) of the circuit board 150. The energetic potting material 202 may have a thickness substantially greater than a thickness of any of the electrical components 114.

As noted previously, the energetic potting material 202 may include an oxidizer and a metal fuel. The metal fuel may include one or more of magnesium, titanium, tantalum, zirconium, hafnium, aluminum, nickel, cobalt, iron, zinc, molybdenum, oxides thereof, and hydrides thereof. The oxidizer may comprise a binder formulated and configured to bind the metal fuel in the energetic potting material 202. The binder may be a urethane binder, such as a halogenated urethane binder. As used herein, the term "urethane" means and includes a material produced by a reaction of an isocyanate containing two or more isocyanate groups (—R—(N—C=O)$_n$) (e.g., a diisocyanate, an isocyanate including a plurality of isocyanate groups (i.e., a multi-functional terminated isocyanate), etc.) with a polyol containing two or more hydroxyl groups (R'—(OH)$_n$), wherein n is at least two. A urethane comprises one or more urethane groups (i.e., —NH—(COO)—). As used herein, a "polyol" means and includes a compound including at least two hydroxyl groups. A polyol having two hydroxyl groups may also be referred to as a "diol." In some embodiments, the polyol comprises a plurality of hydroxyl terminations. The urethane binder may be a thermoset urethane (i.e., a urethane that cannot be melted and reformed), or a thermoplastic urethane (i.e., a polymer that can be melted and reformed).

The reaction between the isocyanate and the polyol may proceed in the presence of a catalyst or may be activated with ultraviolet light, as known in the art. Thus, the urethane binder may comprise a two-part urethane formed by reacting an isocyanate with a polyol (e.g., a diol), such as in a polymerization reaction.

The urethane binder may be formulated to exothermically react with the metal fuel responsive to application of sufficient activation energy to initiate the exothermic reaction. The metal fuel and the urethane binder may be consumed during the exothermic reaction, substantially consuming all of the energetic potting material 202 and destroying the electronic device 100 (FIG. 1) potted by the energetic potting material 202. In some embodiments, the urethane binder comprises a halogenated urethane binder. The halogen may include fluorine, chlorine, bromide, iodine, or combinations thereof. In some embodiments, the halogenated urethane binder comprises a perhalogenated compound. As used herein, a "perhalogenated" compound means and includes a compound including carbon-halogen bonds and substantially no carbon-hydrogen bonds. In some such embodiments, the halogenated urethane binder may include a perfluorinated compound, a perchlorinated compound, a perbrominated compound, a periodated compound, or a perhalogenated compound including a plurality of carbon-fluorine, carbon-chlorine, carbon-bromine, and carbon-iodine bonds.

The polyol may include an organic compound including one or more (e.g., one, two, three, four, etc.) hydroxyl terminations. In some embodiments, the polyol has the formula HO—R—OH, wherein R is an aromatic group (i.e., an aryl group), an aliphatic group, or another functional group. In some embodiments, R may include a branched group including one or more additional hydroxyl terminations. Where R is an aromatic group, R may include one or more of benzyl groups, toluene groups, xylene groups, or other aryl group including at least one carbon ring. Where R is an aliphatic group, R may include an alkyl group (e.g., methyl, ethyl, propyl, butyl, pentyl, hexyl, octyl, dodecyl, and/or octadecyl groups), an alkenyl group (C=C), an alkynyl group (C≡C), and combinations thereof. R may further include one or more additional functionalities, such as an amine group, a polyamine group, a hydroxyl group, a carboxyl group, a carbonyl group, an epoxy group, or an organohalide.

In some embodiments, the polyol may be selected to include one or more halogens that will form at least a part of the halogenated binder. By way of nonlimiting example, R may comprise an organohalide (e.g., an organofluoride, an organochloride, an organobromide, or an organoiodide). Thus, the polyol may be a halogenated polyol, such as a fluorinated polyol, a chlorinated polyol, a brominated polyol, an iodinated polyol, or a polyol including at least two of fluorine, chlorine, bromine, or iodine. The polyol may include a perhalogenated polyol, such as a perfluorinated polyol, a perchlorinated polyol, a perbrominated polyol, a periodated polyol, or a perhalogenated polyol including a plurality of carbon-fluorine, carbon-chlorine, carbon-bromine, and carbon-iodine bonds.

Where R comprises an organohalide, the organohalide may include halogenated alkyl groups including one or more of fluorine, chlorine, bromine, or iodine. In some such embodiments, the polyol may have the formula HO—(RH$_{(2-z)}$X$_z$)$_n$—OH, wherein n is an integer between about 1 and about 20, such as between about 1 and about 5, between about 5 and about 10, or between about 10 and about 20, and X is one of fluorine, chlorine, bromine, or iodine and z is equal to 0, 1, or 2. In other embodiments, the organohalide may include a halogenated aromatic group such as one or more halogenated benzyl, toluene, xylene, or other aryl group including at least one carbon ring.

The organohalide may include one or more additional functional groups, such as, for example, an alkenyl (C=C) group, an alkynyl (C≡C) group, a hydroxyl group, a carbonyl group, an amine group, an organosulfur group, an epoxy group, and a polyamine group. In some embodiments, the polyol is one of a halogenated polyethylene glycol, or a halogenated polypropylene glycol.

In other embodiments, the polyol includes a multi-functional hydroxyl-terminated polyol (e.g., a diol) of a perfluoroalkoxy alkane (PFA) (e.g., a perfluoropolyoxy alkane) having the general formula $(-C_2F_4)_n(CF_2CF-O-CF_3)_m-$, wherein n is an integer between about one and about twenty, such as between about one and about five, between about five and about ten, or between about ten and about twenty and m is an integer between about one and about twenty, such as between about one and about five, between about five and about ten, or between about ten and about twenty and is not necessarily equal to n. Two of the fluorine atoms may be replaced with a hydroxyl group to form the diol. In other embodiments, more than two fluorine atoms may be replaced to form a polyol of a perfluoroalkoxy alkane. In some embodiments, the polyol comprises a multi-functional hydroxyl-terminated perfluoropolyoxy alkane.

A molecular weight of the polyol may be between about 200 g/mol and about 3000 g/mol, such as between about 200 and about 500, between about 500 and about 1000, between about 1000 and about 1500, or between about 1500 and about 2000 g/mol. In some embodiments, the polyol has a molecular weight of about 1400 g/mol.

In some embodiments, the isocyanate may include a diisocyanate having the general formula $O=C=N-R'-N=C=O$, wherein R' comprises at least one aromatic group, such as, for example, one or more of benzyl groups, toluene groups, xylene groups, or other aryl group including at least one carbon ring. Where R' is an aliphatic group, R' may include an alkyl group (e.g., methyl, ethyl, propyl, butyl, pentyl, hexyl, octyl, dodecyl, and/or octadecyl groups), an alkenyl group (C=C), or an alkynyl group (C≡C). R' may further include one or more additional functionalities, such as an amine group, a hydroxyl group, a carboxyl group, a carbonyl group, or an organohalide. In some embodiments, the isocyanate comprises a plurality (e.g., two, three, four, etc.) isocyanate groups, such as a multi-functional terminated isocyanate.

In some embodiments, the isocyanate comprises methyl diphenyl diisocyanate (MDI) ($C_{15}H_{10}N_2O_2$), an MDI prepolymer, or toluene diisocyante (TDI) ($C_9H_6N_2O_2$). Where the isocyanate comprises an MDI prepolymer, the MDI prepolymer may include isocyanates sold under the tradename ISONATE™, and commercially available from the DOW Chemical Company of Midland, Mich. In other embodiments, the isocyante includes an aliphatic or a cycloaliphatic isocyanate, such as, for example, 1,6-hexamethylene diisocyanate (HDI) or a prepolymer thereof, 1-isocyanatomethyl-3,5,5-trimethyl-cyclohexane (isophorone diisocyanate, IPDI) or a prepolymer thereof, and 4,4'-diisocyanato dicyclohexylmethane, ($H_{12}$MDI or hydrogenated MDI).

In yet other embodiments, where R' includes an organohalide (e.g., an organofluoride, organochloride, an organobromide, or an organoiodide), the isocyanate may include a halogenated alkyl group (e.g., one of a halogenated methyl, ethyl, propyl, butyl, pentyl, hexyl, octyl, dodecyl, and/or octadecyl group), or a halogenated aryl group (e.g., a halogenated benzyl group, a halogenated toluene group, a halogenated xylene group, etc., such as bisphenol AF diisocyanate). The organohalide may include one or more additional functional groups, such as, for example, an alkenyl (C=C) group, an alkynyl (C≡C) group, a hydroxyl group, a carbonyl group, an amine group, an organosulfur group, an epoxy group, and a polyamine group.

The isocyante may have a molecular weight between about 150 and about 4000, depending on the isocyanate that is used and whether the isocyante includes any halogen atoms.

Accordingly, the halogen in the halogenated urethane binder may be present in at least one of the polyol or the diisocyanate used to form the halogenated urethane binder. Thus, each of the polyol and the isocyanate may include one or more halogen atoms and may include, for example, a fluorinated compound, a chlorinated compound, a brominated compound, an iodinated compound, or a combination thereof.

Reaction of the isocyanate with the polyol may form a urethane compound (e.g., a polyurethane) having the formula $(-(C=O)NH-R'-NH-(C=O)-O-R-O-)_n$, wherein R and R' are the same as described above with respect to the polyol and the isocyanate, respectively, and n comprises an integer between about one and about fifty.

Figure 3:
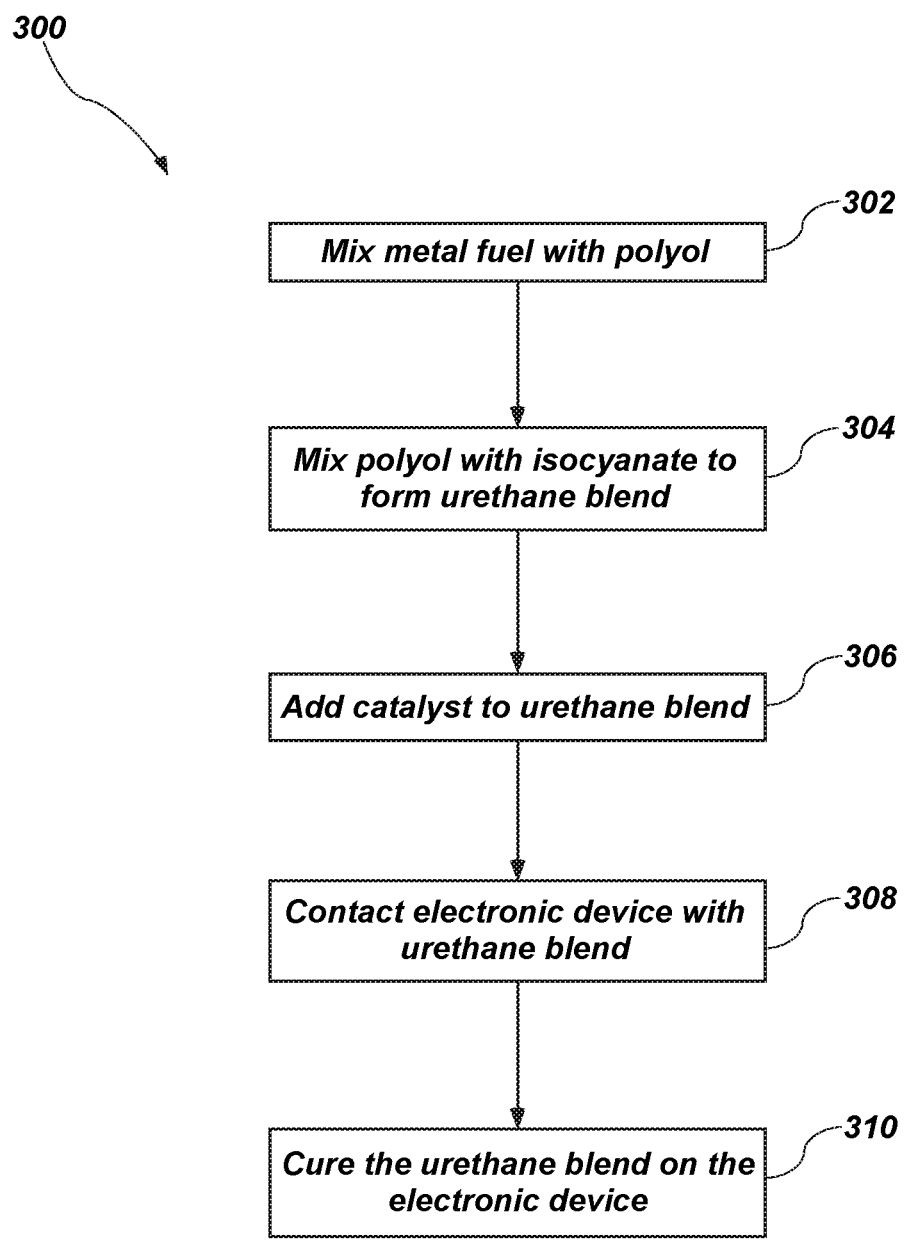
FIG. 3 is a flowchart illustrating a method of forming an potted electronic device coated with an energetic potting material, in accordance with an embodiment of the disclosure.

FIG. 3 is a simplified flow diagram illustrating a method 300 of forming the energetic potting material 202 (FIG. 2A) and encapsulating at least a portion of the electronic device 100 (FIG. 1) (e.g., the circuit board 150 (FIG. 1)) with the energetic potting material 202, in accordance with an embodiment of the disclosure. The method 300 may include a mixing process 302 including mixing one or more metal fuels with the polyol; a urethane blend formation process 304 including mixing the polyol (including the metal fuels) with an isocyanate to form a urethane blend; a catalyst addition process 306 including adding a catalyst to the urethane blend; a potting process 308 including contacting at least a portion of the electronic device 100 with the urethane blend; and a curing process 310 including curing the urethane blend on or around the electronic device 100.

The mixing process 302 may include mixing at least one metal fuel with a liquid polyol. The polyol may be disposed within a vessel or other container and the at least one metal fuel may be added to the vessel. The vessel may include a mixer configured to mix metal particles of the at least one metal fuel with the polyol and substantially uniformly disperse the at least one metal fuel within the polyol.

The at least one metal fuel includes at least one of magnesium, titanium, tantalum, zirconium, hafnium, aluminum, nickel, cobalt, iron, zinc, molybdenum, or oxides thereof. In some embodiments, the metal fuel includes one or more of magnesium, titanium, and aluminum.

The metal fuel may be provided to the polyol as a powder. The powder may include particles having one or more of a spherical-shape, a cylindrical-shape, flake-shape, or another shape. In other embodiments, the powder comprises flakes. The powder may have a size (e.g., a diameter) of about 100 nm and about 250 μm, such as about between about 100 nm and about 1 μm, between about 1 μm and about 100 μm, or between about 100 μm and about 250 μm. In some embodiments, the metal powder be 325 mesh (i.e., may be sized such that it passes through a screen sized such that particles having a size less than about 44 μm pass therethrough).

The urethane blend formation process 304 may include mixing the polyol including metal particles dispersed therein with the isocyanate to form the urethane blend. The isocyanate may be added to the vessel including the polyol and the at least one metal fuel dispersed therein. In some embodiments, the isocyanate may be heated to above a melting temperature of the isocyanate prior to adding the isocyanate to the vessel. For example, where the isocyanate comprises MDI, the MDI may be heated to a temperature above about 40° C.

The catalyst addition process 306 includes introducing a catalyst into the urethane blend. The catalyst may include any catalyst suitable for increasing a reaction rate of the polyol with the isocyanate to form the urethane blend. In some embodiments, the catalyst includes an organotin catalyst, such as dibutyltin dilaurate (DBTDL). An amount of catalyst added to the urethane blend may be selected to determine an amount of time (e.g., a pot life) the urethane blend may be processed before the urethane reaction is complete. In some embodiments, increasing an amount of catalyst added to the urethane blend may increase a reaction rate of the polyol and the isocyanate and may decrease the pot life of the urethane blend. In some embodiments, sufficient catalyst may be added such that the pot life of the urethane blend is about thirty minutes (e.g., within thirty minutes, substantially all of the polyol has reacted with the isocyanate). The catalyst may be dispersed within the urethane blend by mixing the catalyst with the mixer.

During mixing of polyol, the isocyanate, and the catalyst, the isocyanate and the polyol may react to form the halogenated urethane binder. The urethane blend may be mixed to increase contact between the polyol, the isocyanate, and the catalyst and to disperse the at least one metal fuel within the urethane blend as the urethane blend is formed.

The potting process 308 includes contacting the electronic device 100 with the urethane blend. In some embodiments, the potting process 308 includes substantially completely encapsulating the circuit board 150 and any other components of the electronic device 100 with the energetic potting material 202.

Figure 4:
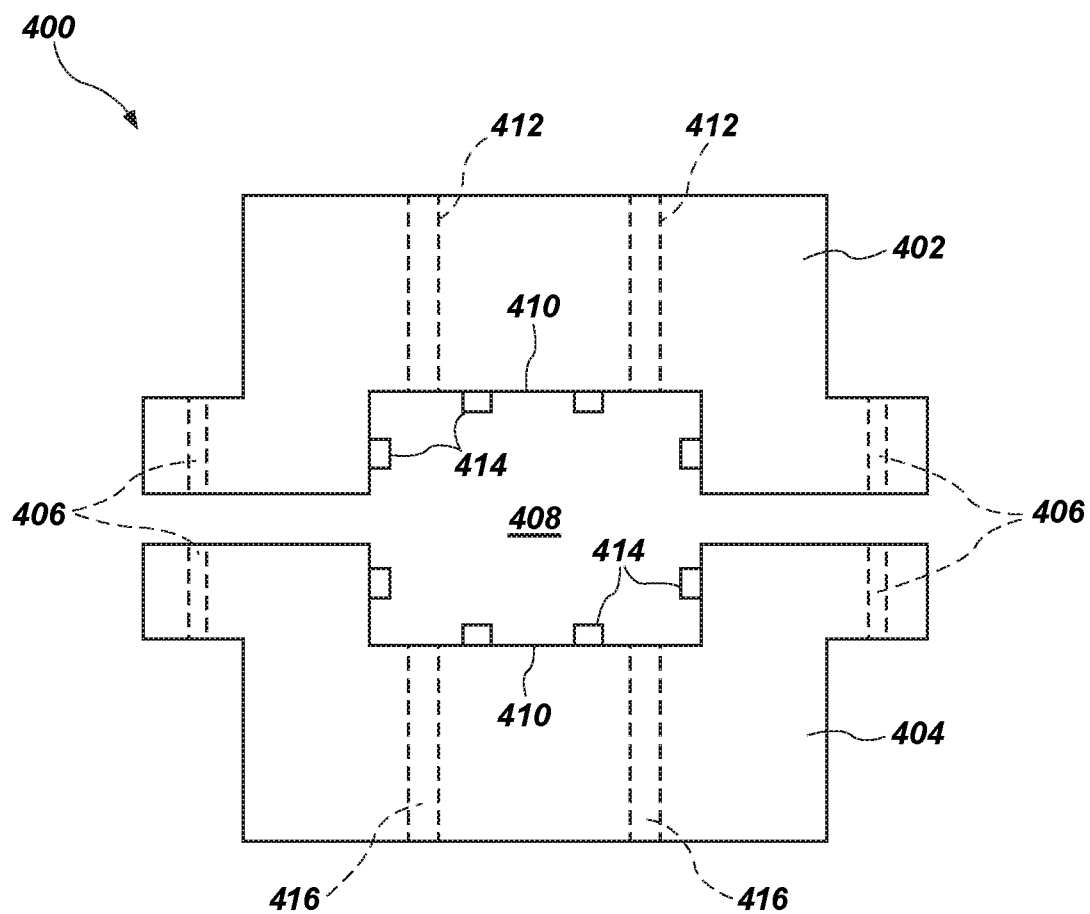
FIG. 4 is a cross-sectional view of a mold used to pot the electronic device in an energetic potting material, in accordance with an embodiment of the disclosure.

In some embodiments, the potting process 308 includes introducing the urethane blend into a vessel containing the electronic device 100 using, for example, a transfer-molding or injection molding process, as known to those of ordinary skill in the art. For example, and with reference to FIG. 4, the electronic device 100 (FIG. 1) may be disposed in a mold 400 configured to receive the electronic device 100. The mold 400 may include an upper section 402 and a lower section 404. The upper section 402 and the lower section 404 may include through holes 406 for connecting the upper section 402 to the lower section 404. The through holes 406 may include threads configured to threadingly engage the upper section 402 to the lower section 404.

Interior surfaces 410 of the mold 400 may define an internal cavity 408, in which the electronic device 100 (FIG. 1) is disposed. The internal cavity 408 may be sized and shaped to retain the electronic device 100. At least one of the upper section 402 and the lower section 404 may include one or more injection ports 412 through which the urethane blend may be introduced into the internal cavity 408, and other exhaust ports 416 through which air may be expelled from the internal cavity 408 as it is displaced by the urethane blend. The urethane blend may substantially fill the internal cavity 408 and may substantially cover the electronic device 100. In some embodiments, the interior surfaces 410 of at least one of the upper section 402 and the lower section 404 may include one or more protrusions 414 configured to space the electronic device 100 from the interior surface 410 such that substantially all sides of the electronic device 100 are covered by the energetic potting material 202.

In other embodiments, the electronic device 100 may include a desktop computer, a laptop computer, a mobile phone, or other electronic device in which electronic components (e.g., one or more circuit boards 150) are housed. In some such embodiments, the potting process 308 may include directly injecting the urethane blend into a housing (e.g., housing 116 (FIG. 2A, FIG. 2B)) that surrounds, covers, or otherwise houses the electronic components of the electronic device 100. By way of nonlimiting example, the urethane blend may be injected directly into a laptop case, a desktop computer case, a mobile telephone case, etc., adjacent electronic device 100.

In other embodiments, the urethane blend may be poured over only some surfaces of the electronic device 100 rather than molded thereabout. By way of nonlimiting example, the electronic device 100 may be placed within a container and the urethane blend may be poured onto at least one surface of the electronic device 100. In some such embodiments, the energetic potting material 202 may coat only some surfaces of the electronic device 100, as illustrated in FIG. 2B.

With reference again to FIG. 3, the curing process 310 may include curing the urethane blend after the energetic potting material 202 (FIG. 2A, FIG. 2B) is disposed over at least one surface of the electronic device 100. The urethane blend may be formulated to cure when exposed to ambient temperatures (e.g., between about 20° C. and about 25° C.) and ambient pressures (e.g., atmospheric pressure) for a suitable time. In some embodiments, the urethane blend may cure in a time period of between about ten minutes and about one hour, such as about twenty minutes.

Although the metal fuel has been described above as being mixed with the polyol prior to mixing the polyol with the isocyanate to form the urethane, in some embodiments, the metal fuel may be added to the isocyanate prior to mixing the isocyanate with the polyol. In other embodiments, the metal fuel may be added as a separate component to the urethane blend during mixing of the polyol with the isocyanate and prior to the catalyst addition process 306.

The energetic potting material 202 may be formulated to ignite responsive to exposure to an activation energy sufficient to initiate a reaction between the urethane binder and the metal fuel. In some embodiments, the energetic potting material 202 may be substantially unreactive and may be formulated to remain within or over portions of the electronic device 100 without substantially reacting with the electronic device 100 until the activation energy is provided to initiate reaction of the urethane binder with the metal fuel dispersed therein. In some embodiments, the activation energy is provided by the ignition device 204 (FIG. 2A, FIG. 2B).

The ignition device 204 may be configured to be activated (e.g., may initiate the energetic potting material 202 proximate the ignition device 204) responsive to an indication, for example, a voltage or current signal, that an unauthorized user is attempting to, or is, accessing the electronic device 100. By way of nonlimiting example, the device 100 may require a user password to access various programs and information stored therein. Responsive to receiving an incorrect user password after a number of attempts (e.g., three, four, five, etc.), the ignition device 204 may be activated. In other embodiments, the ignition device 204 may be initiated responsive to a user opening a housing wherein the electronic device 100 is disposed. In some such embodiments, the ignition device 204 may include a switch configured to activate the ignition device 204 responsive to opening of the housing 116 (FIG. 2A and FIG. 2B).

The energetic potting material 202 may be formulated to be substantially consumed when the urethane binder reacts with the metal fuel. In some embodiments, the urethane binder comprises a halogenated urethane binder. The halogenated urethane binder may oxidize the metal fuel during reaction of the halogenated urethane binder and the metal fuel. The metal fuel may exothermically react with halogens in the halogenated urethane binder to form a halogenated metal. In other words, halogen atoms present within the urethane binder may react with metal atoms dispersed within the energetic potting material 202 to form metal halides. By way of nonlimiting example, where the metal fuel includes magnesium, titanium, tantalum, zirconium, hafnium, aluminum, nickel, cobalt, iron, zinc, molybdenum, or oxides thereof, reaction of the metal fuel with the halogenated urethane may form a magnesium halide (e.g., $MgF_2$, $MgCl_2$, $MgBr_2$, $MgI_2$), a titanium halide (e.g., $TiF_3$, $TiF_4$, $TiCl_3$, $TiCl_4$, $TiBr_3$, $TiBr_4$, $TiI_4$, etc.), a tantalum halide (e.g., $TaF_5$, $TaCl_5$, $TaBr_5$, $TaI_5$), a zirconium halide (e.g., $ZrF_4$, $ZrCl_4$, $ZrBr_4$, $ZrI_4$), a hafnium halide (e.g., $HfF_4$, $HfCl_4$, $HfBr_4$, $HfI_4$), an aluminum halide (e.g., $AlF_3$, $AlCl_3$, $AlBr_3$, $AlI_3$), a nickel halide (e.g., $NiF_2$, $NiCl_2$, $NiBr_2$, $NiI_2$), a cobalt halide (e.g., $CoF_2$, $CoCl_2$, $CoBr_2$, $CoI_2$), an iron halide (e.g., $FeF_2$, $FeCl_2$, $FeBr_2$, $FeI_2$), a zinc halide (e.g., $ZnF_2$, $ZnCl_2$, $ZnBr_2$, $ZnI_2$), or a molybdenum halide (e.g., $MoF_6$, $MoCl_2$, $MoCl_3$, $MoCl_5$, $MoBr_2$, $MoBr_3$, $MoBr_4$, $MoI_2$, $MoI_3$, $MoI_4$), respectively.

During the reaction of the halogenated urethane binder and the metal fuel, water, nitrogen, carbon monoxide, carbon dioxide, and in some instances, carbon ash may be formed. Once reaction between the urethane binder and the metal fuel is initiated, heat from the exothermic reaction may provide additional energy for the complete combustion of the energetic potting material 202. Heat released from the reaction of the urethane binder and the metal fuel may substantially completely consume the electronic device 100 and any electronic components thereof, substantially completely destroying any information that may be stored in memory of the electronic device 100 by physical destruction of the electronic device 100 itself.

A heat of reaction of the energetic potting material 202 may be between about 2,000 BTU/lb and about 6,000 BTU/lb, such as between about 3,000 BTU/lb and about 5,000 BTU/lb, or between about 3,500 BTU/lb and about 4,500 BTU/lb. In some embodiments, a temperature of the electronic device 100 encapsulated with the energetic potting material 202 may reach up to about 2,500° C. during combustion of the energetic potting material 202, such as between about 1,800° C. and about 2,000° C., between about 2,000° C. and about 2,200° C., or between about 2,200° C. and about 2,500° C.

The energetic potting material 202 may not include any materials that do not provide heat to the heat of reaction during combustion of the energetic potting material 202. In other words, the halogenated urethane binder and the metal fuel that make up the energetic potting material 202 may be energetic materials, and the energetic potting material 202 may be substantially devoid of any other materials that do not contribute to a reaction of the energetic potting material 202 when initiated. Stated another way, the energetic potting material 202 may not include any materials that act as a heat sink during the reaction of the energetic potting material 202. By way of comparison, epoxies or urethanes of other conventional, non-energetic potting materials may act as a heat sink.

Advantageously, the energetic potting material 202 may not be substantially reactive and may encapsulate or otherwise remain adjacent the electronic device 100 without substantially reacting with electrical components (e.g., the circuit board 150) during transport, handling and operation of electronic device 100 or a system incorporating electronic device 100 until a sufficient activation energy, for example, by an ignition device 204, is provided to initiate reaction of the energetic potting material 202. The energetic potting material 202 may be suitable for anti-tamper applications wherein a user of an electronic device desires to prevent access to the electronic device by unauthorized users.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A potted electronic device, comprising:
   an electronic device at least partially encapsulated by an energetic potting material, the energetic potting material comprising:
   a halogenated urethane binder; and
   at least one metal fuel selected from the group consisting of magnesium, titanium, tantalum, zirconium, hafnium, aluminum, nickel, cobalt, iron, zinc, molybdenum, oxides thereof, and hydrides thereof dispersed within the halogenated urethane binder.

2. The potted electronic device of claim 1, wherein the halogenated urethane binder comprises a fluorinated urethane binder.

3. The potted electronic device of claim 1, wherein the halogenated urethane binder comprises a perhalogenated urethane binder.

4. The potted electronic device of claim 1, wherein the halogenated urethane binder comprises a reaction product of a multi-functional terminated isocyanate and a multi-functional hydroxyl-terminated perfluoropolyoxy alkane.

5. The potted electronic device of claim 1, wherein the at least one metal fuel comprises spherical particles having an average particle size between about 1 μm and about 100 μm.

6. The potted electronic device of claim 1, wherein a mass of the energetic potting material is between about 1 time and about 10 times a mass of the electronic device.

7. The potted electronic device of claim 1, further comprising at least one ignition device coupled to the energetic potting material.

8. The potted electronic device of claim 7, wherein the at least one ignition device is configured to initiate the energetic potting material responsive to receiving an indication of unauthorized use of the electronic device.

9. The potted electronic device of claim 1, wherein the electronic device is incorporated in one of a desktop computer, a laptop computer, or a mobile phone and the energetic potting material is disposed within a housing containing the electronic device.

10. An energetic potting material formulated and configured to provide environmental protection to an electronic device, the energetic potting material comprising:
    a halogenated urethane binder; and
    at least one metal fuel selected from the group consisting of magnesium, titanium, tantalum, zirconium, hafnium, aluminum, nickel, cobalt, iron, zinc, molybdenum, oxides thereof, and hydrides thereof, dispersed within the halogenated urethane binder.

11. The energetic potting material of claim 10, wherein the halogenated urethane binder comprises a perfluorinated urethane binder.

12. The energetic potting material of claim 10, wherein the halogenated urethane binder comprises chlorine and fluorine.

13. The energetic potting material of claim 10, wherein the at least one metal fuel comprises magnesium, titanium, and aluminum.

14. The energetic potting material of claim 10, wherein the halogenated urethane binder comprises a reaction product of an isocyanate and a perfluorinated diol.

15. A method of forming an at least partially encapsulated electronic device, the method comprising:
 mixing metal particles selected from the group consisting of magnesium, titanium, tantalum, zirconium, hafnium, aluminum, nickel, cobalt, iron, zinc, molybdenum, oxides thereof, and hydrides thereof with at least one halogenated polyol to form a mixture of the metal particles dispersed within the at least one halogenated polyol;
 mixing the mixture with a diisocyanate to form a urethane blend comprising a reaction product of the halogenated polyol and the diisocyanate, the metal particles dispersed within the urethane blend; and
 contacting a substantial portion of an electronic device with the urethane blend.

16. The method of claim 15, further comprising selecting the at least one halogenated polyol to comprise a perhalogenated polyol.

17. The method of claim 15, further comprising selecting the at least one halogenated polyol to comprise a perfluorinated polyol.

18. The method of claim 15, wherein mixing the mixture with a diisocyanate to form a urethane blend comprises mixing the mixture with methyl diphenyl diisocyanate or a prepolymer thereof.

19. The energetic potting material of claim 10, wherein the halogenated urethane binder comprises a fluorinated urethane binder.

20. The energetic potting material of claim 10, wherein the at least one metal fuel comprises spherical particles having an average particle size between about 1 µm and about 100 µm.

21. The energetic potting material of claim 10, wherein the halogenated urethane binder comprises a reaction product of a multi-functional terminated isocyanate and a multi-functional hydroxyl-terminated perfluoropolyoxy alkane.

22. The energetic potting material of claim 10, wherein a heat of reaction of the energetic potting material is between about 2,000 BTU/lb and about 6,000 BTU/lb.

23. The energetic potting material of claim 10, wherein the halogenated urethane binder comprises chlorine.

24. The energetic potting material of claim 10, wherein the halogenated urethane binder comprises a reaction product of a polyol with methyl diphenyl diisocyanate or a prepolymer thereof.

25. The energetic potting material of claim 10, wherein the energetic potting material has a mass between about one time and about ten times a mass of the electronic device.

* * * * *

UNITED STATES PATENT AND TRADEMARK OFFICE
CERTIFICATE OF CORRECTION

PATENT NO. : 10,042,397 B2
APPLICATION NO. : 15/046979
DATED : August 7, 2018
INVENTOR(S) : Nikki Rasmussen and Reston A Condit Page 1 of 1

It is certified that error appears in the above-identified patent and that said Letters Patent is hereby corrected as shown below:

In the Specification
Column 1, Line 10, change "DE-AC07-05-1D14517" to --DE-AC07-05-ID14517--

Signed and Sealed this
Second Day of October, 2018

Andrei Iancu
*Director of the United States Patent and Trademark Office*